United States Patent
Lee et al.

(10) Patent No.: US 12,407,540 B2
(45) Date of Patent: Sep. 2, 2025

(54) METHOD AND APPARATUS FOR SETTING MULTIPLE CONTROLLERS IN WIRELESS LAN SYSTEM IN SMART HOME ENVIRONMENT

(71) Applicant: LG ELECTRONICS INC., Seoul (KR)

(72) Inventors: Byungjoo Lee, Seoul (KR); Hangyu Cho, Seoul (KR); Jeonghwan Kim, Seoul (KR); Youngjun Jo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 401 days.

(21) Appl. No.: 18/018,531

(22) PCT Filed: Jul. 28, 2021

(86) PCT No.: PCT/KR2021/009773
§ 371 (c)(1),
(2) Date: Jan. 27, 2023

(87) PCT Pub. No.: WO2022/025614
PCT Pub. Date: Feb. 3, 2022

(65) Prior Publication Data
US 2023/0308305 A1    Sep. 28, 2023

(30) Foreign Application Priority Data
Jul. 28, 2020 (KR) .......................... 10-2020-0093940

(51) Int. Cl.
*H04W 84/12* (2009.01)
*H04L 12/28* (2006.01)
*G16Y 10/80* (2020.01)

(52) U.S. Cl.
CPC .......... *H04L 12/2809* (2013.01); *G16Y 10/80* (2020.01); *H04W 84/12* (2013.01)

(58) Field of Classification Search
CPC .................................................... H04W 84/12
(Continued)

(56) References Cited

U.S. PATENT DOCUMENTS

2020/0175846 A1 * 6/2020 Boettcher .............. G08B 25/08

FOREIGN PATENT DOCUMENTS

| CN | 101455024 A | * 6/2009 | ........... H04L 63/062 |
| KR | 20110115093 | 10/2011 | |

(Continued)

OTHER PUBLICATIONS

National AI Research Institute—Making a Better Tomorrow, Newsletter No. 148, non-official translation (ETRI. Trends of IoT Standards Institute-Issues and Future prospects of the Three Major Institutes. Standardization Newsletter), May 2020, 4 pages.

(Continued)

*Primary Examiner* — Sibte H Bukhari
(74) *Attorney, Agent, or Firm* — LEE, HONG, DEGERMAN, KANG & WAIMEY

(57) ABSTRACT

Proposed are a method and an apparatus in which a plurality of CHIP controllers control an accessory STA in a wireless LAN system in a smart home environment. Particularly, the accessory STA performs a connection procedure for a first CHIP network to which a first controller belongs. The accessory STA receives a set configuration request message from the first controller. The accessory STA transmits a set configuration response message to the first controller. The accessory STA performs a connection procedure for a second CHIP network to which a second controller belongs.

12 Claims, 16 Drawing Sheets

(a)

(b)

(58) Field of Classification Search
USPC .......................................................... 370/259
See application file for complete search history.

(56) References Cited

FOREIGN PATENT DOCUMENTS

| | | |
|---|---|---|
| KR | 20140141747 | 12/2014 |
| KR | 20200086152 | 7/2020 |

OTHER PUBLICATIONS

PCT International Application No. PCT/KR2021/009773, International Search Report dated Oct. 28, 2021, 4 pages.

\* cited by examiner (a)

(b)

METHOD AND APPARATUS FOR SETTING MULTIPLE CONTROLLERS IN WIRELESS LAN SYSTEM IN SMART HOME ENVIRONMENT

CROSS-REFERENCE TO RELATED APPLICATIONS

This application is the National Stage filing under 35 U.S.C. 371 of International Application No. PCT/KR2021/009773, filed on Jul. 28, 2021, which claims the benefit of earlier filing date and right of priority to Korean Application No. 10-2020-0093940, filed on Jul. 28, 2020, the contents of which are all incorporated by reference herein in their entirety.

TECHNICAL FIELD

The present specification relates to a method for configuring multiple controllers in a wireless LAN system in a smart home environment, and more particularly, to a method and apparatus for controlling or monitoring an accessory STA by a plurality of CHIP controllers.

BACKGROUND

Amazon, Apple, Google and the Zigbee Alliance today announced a new joint working group to advance the development and adoption of a new, royalty-free connectivity standard that increases compatibility among smart home products and embeds security into fundamental design principles. IKEA, Legrand, NXP Semiconductors, Resideo, Samsung SmartThings, Schneider Electric, Signify (Philips Hue), Silicon Labs, Somfy, Wuhan, and ThinQ (LG Electronics) etc., which constitute the board of directors of the Zigbee Alliance will also join the joint committee and contribute to the project toward a common goal.

The goal of the Connected Home over IP project is to simplify development for manufacturers and increase compatibility for consumers. The project is based on the common belief that smart home devices must ensure security, stability and seamless usability. The project aims to enable communication between smart home devices, mobile apps, and cloud services based on the Internet Protocol (IP), and to define a set of specific IP-based networking technologies for device authentication.

An industry joint committee adopts an open source approach in the development and implementation of new integrated connectivity protocols. The project will utilize market-proven smart home technologies from Amazon, Apple, Google, and the Zigbee Alliance. The decision to leverage these technologies is expected to accelerate the protocol development process and deliver benefits quickly to manufacturers and consumers.

The project aims to simplify the creation of devices compatible with smart homes and voice-recognition services such as Amazon's Alexa, Apple's Sin, and Google's Assistant for device makers. The forthcoming protocol will complement existing technologies, and the Joint Committee members encourage device manufacturers to continue to pursue innovations based on existing technologies.

The Connected Home over IP project encourages device manufacturers, silicon providers and developers in the smart home industry to participate in and contribute to standards development.

SUMMARY his specification proposes a method and apparatus for configuring multiple controllers in a wireless LAN system in a smart home environment.

An example of the present specification proposes a method in which one accessory STA is connected to a plurality of different CHIP networks.

This embodiment proposes a method for controlling or monitoring an IoT device by a plurality of IoT controllers belonging to different CHIP networks in a smart home environment where the IoT controller controls or monitors the IoT device. First and second controllers described below may correspond to the IoT controller device, and an accessory STA may correspond to the IoT device. It is assumed that the first and second controllers are not entities connected to each other on based on an account or a cloud, but are operated independently of each other.

An accessory station (STA) performs a connection procedure for a first Connected Home over IP (CHIP) network to which a first controller belongs. In the connection procedure for the first CHIP network, the accessory STA may be registered or searched based on a Quick Response (QR) code or a setup code of the accessory STA. The accessory STA may be connected to an access point (AP) by the first controller. After the accessory STA is authenticated by the first controller, a first secure channel may be established between the accessory STA and the first controller. The first secure channel may be generated based on each public key included in the certificate and the setup code. After receiving a first operational credential from the first controller through the first secure channel, the accessory STA may be set to an onboarded state for the first CHIP network. The first operating credential is access control information or authority information of the accessory STA, which can include the accessory STA's name, manufacturer, hardware version, software version, unique ID, IP address, MAC address, certificate related to authentication, public key, etc.

The accessory STA receives a Set Configuration Request message from the first controller. The Set configuration Request message includes information that the accessory STA can be additionally connected to another CHIP network. That is, the Set Configuration Request message may request a configuration change so that the accessory STA can be on-boarded to a plurality of CHIP networks.

The accessory STA transmits a Set Configuration Response message to the first controller. The Set Configuration Response message is a response to the Set Configuration Request message, and after the Set Configuration Response message is transmitted, the accessory STA is onboarded for the first CHIP network, and the accessory STA may be further changed to a state capable of onboarding to other CHIP networks.

After the Set Configuration Response message is transmitted, the accessory STA may generate an instance for the other CHIP network. The accessory STA may inform the first controller of a capability of the accessory STA. The capability of the accessory STA may be a capability that the accessory STA supports a plurality of CHIP networks.

The accessory STA performs a connection procedure for a second CHIP network to which a second controller belongs. The connection procedure for the second CHIP network may be performed based on instances for the other CHIP network. In the connection procedure for the second CHIP network, the accessory STA may be registered or searched based on the QR code or the setup code of the accessory STA. The accessory STA may be connected to the AP by the second controller. After the accessory STA is authenticated by the second controller, a second secure channel may be established between the accessory STA and the second controller. The second secure channel may be generated based on each public key included in the certificate and the setup code. After receiving a second operational credential from the second controller through the second secure channel, the accessory STA may be set to an onboarded state for the second CHIP network. The second operating credential is access control information or authority information of the accessory STA, and can include the accessory STA's name, manufacturer, hardware version, software version, unique ID, IP address, MAC address, certificate related to authentication, public key, etc.

Through the above procedure, the accessory STA may be connected to the second CHIP network as well as the first CHIP network. The AP may be physically connected to the first and second controllers and the accessory STA. That is, the first controller configuring the first CHIP network and the accessory STA may be connected to one AP, and the second controller configuring the second CHIP network may be connected to the accessory STA. The network by the AP may be physically configured of one network, but the CHIP network may be logically configured of several networks for one AP (the first and second CHIP networks may be logically distinguished). That is, the AP may be physically connected to the first and second controllers and the accessory STA. The accessory STA may be simultaneously logically connected to the first and second CHIP networks.

As such, the accessory STA is controlled or monitored by the first and second controllers. Specifically, the accessory STA may receive a first control message from the first controller through the first secure channel and receive a second control message from the second controller through the second secure channel. In this case, the accessory STA may be controlled or monitored by the first controller based on the first control message, and controlled or monitored by the second controller based on the second control message.

In the past, IoT devices were controlled or monitored in a smart home environment based on an account or a cloud. However, the embodiment proposed in this specification proposes a connection protocol between independent device entities, so that when a new IoT device is added in an environment with multiple controllers, all controllers can easily set the control authority for the additional device. There is an effect that various convenience functions can be implemented based on IoT technology.

DETAILED DESCRIPTION

Figure 1:
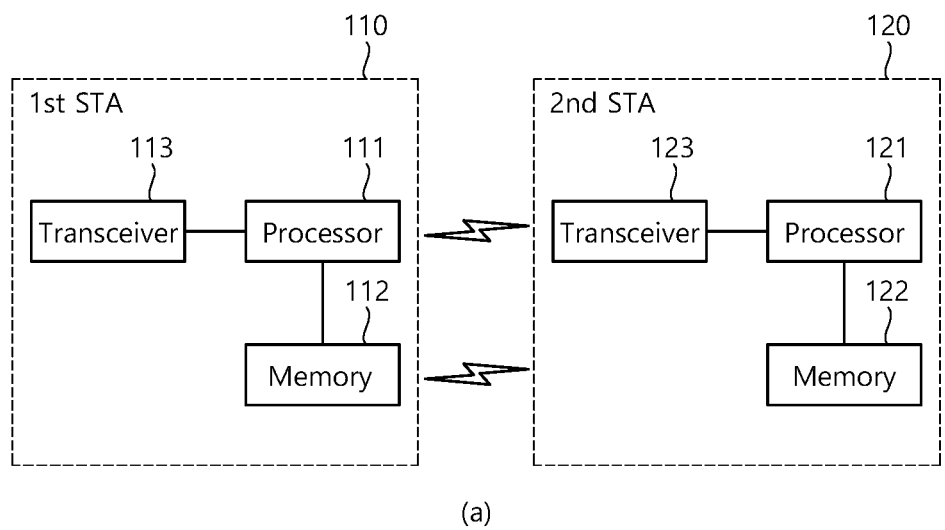
FIG. 1 shows an example of a transmitting apparatus and/or receiving apparatus of the present specification.
Figure 1:
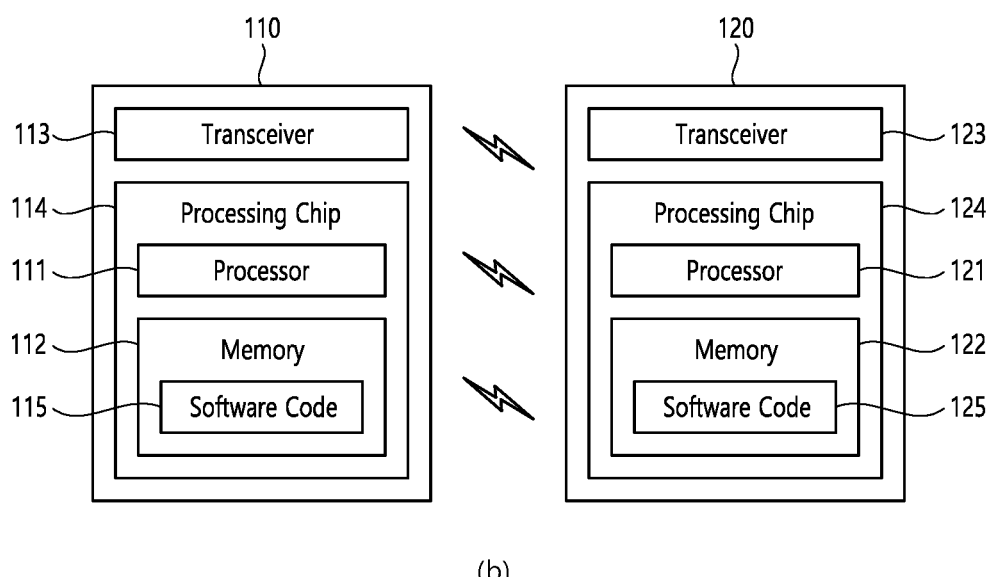

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may denote that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a $3^{rd}$ generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP.

The STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, a STA1, a STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

Figure 2:
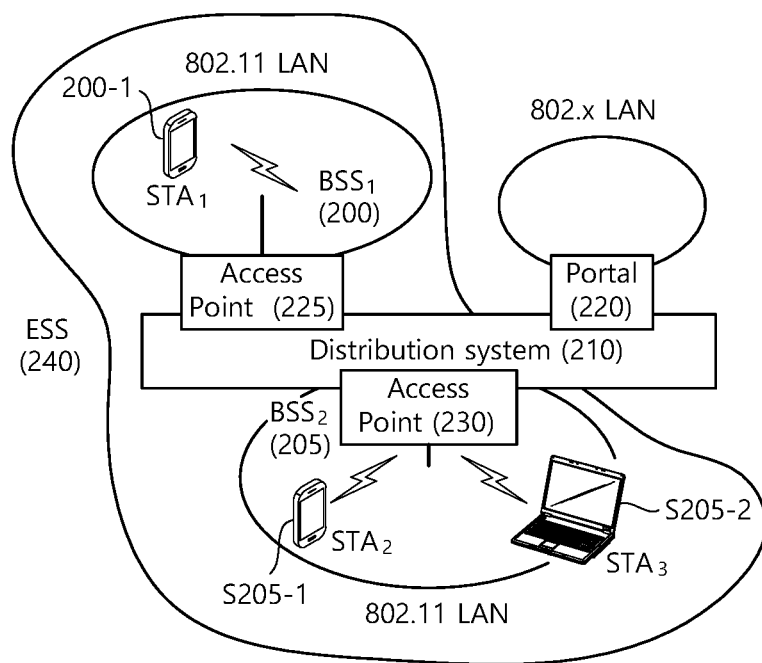
FIG. 2 is a conceptual view illustrating the structure of a wireless local area network (WLAN).
Figure 2:
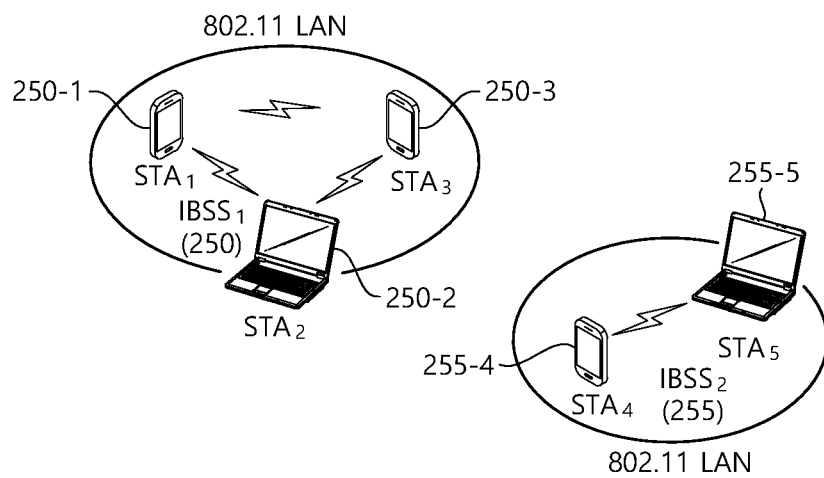

FIG. 2 is a conceptual view illustrating the structure of a wireless local area network (WLAN).

An upper part of FIG. 2 illustrates the structure of an infrastructure basic service set (BSS) of institute of electrical and electronic engineers (IEEE) 802.11.

Referring the upper part of FIG. 2, the wireless LAN system may include one or more infrastructure BSSs 200 and 205 (hereinafter, referred to as BSS). The BSSs 200 and 205 as a set of an AP and a STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (IEEE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

Figure 3:
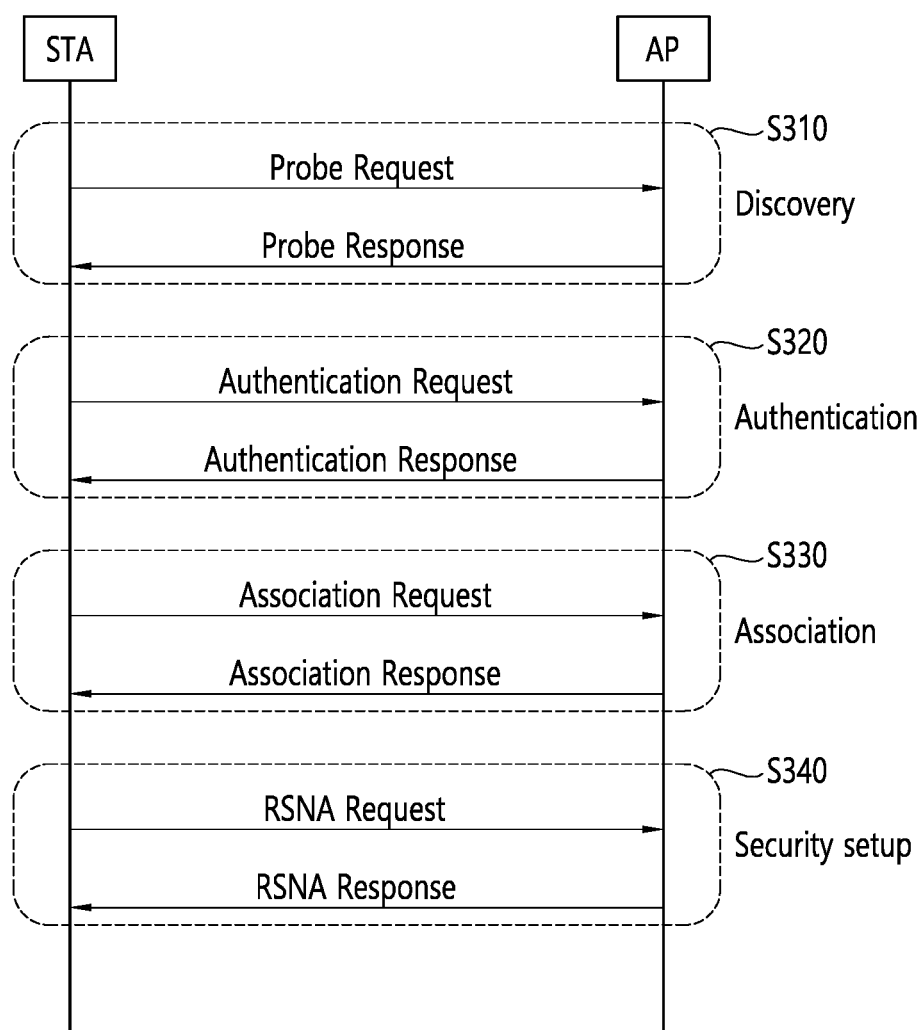
FIG. 3 illustrates a general link setup process.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information related to a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/response are management frames.

The authentication frames may include information related to an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information related to various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information related to various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

1. Zigbee and Connected Home Over IP (CHIP)

<Necessity of Zigbee>

Currently, there are standards for data such as voice, PC LANs, and video, but there are no wireless network standards to meet the specific needs of sensors or control devices. Sensors and control devices do not require high frequency bandwidth, but require short latency and low energy consumption for long battery life and a wide array of devices.

Today, various wireless communication systems that do not require high data rates and can operate at low cost and with low power consumption are being produced.

Products produced in this way are manufactured without standards, and eventually these past products cause compatibility problems with each product, as well as compatibility with new technologies.

\<About Zigbee>

ZigBee is a high-level communication protocol using small, low-power digital radios based on IEEE 802.15.4-2003. IEEE 802.15.4-2003 is a standard for short-range personal wireless communication networks such as lamps, electronic meters, and consumer electronics that use short-range radio frequencies. ZigBee is mainly used in RF (Radio Frequency) applications that require low data rates, low battery consumption, and network safety.

\<Features of Zigbee>
1) Low power consumption, simple implementation
2) Can be used for months or years on a single battery charge
3) It has an active mode (receive, transmit) and a sleep mode.
4) Device, installation, maintenance, etc. are all possible at relatively low cost
5) Safety (Security)
6) Reliability
7) Flexibility
8) Very small protocol stack
9) Interoperable and usable anywhere
10) High node density per network (ZigBee's use of IEEE 802.15.4 makes it possible to handle many devices in a network. This feature allows for massive sensor arrays and network control)
11) Simple protocol, implemented internationally (The size of the ZigBee protocol stack code is only about a quarter of the size of Bluetooth or 802.11.)

\<Fields of Use of Zigbee>

Zigbee is currently used in fields such as industrial control, embedded sensors, medical data collection, fire and theft, building automation, and home automation.

1) Smart Energy

Smart Energy provides utilities/energy service providers with a secure and easy-to-use home wireless network to manage energy. Smart Energy gives utilities/energy service providers or their customers direct control of thermostats or other associated devices.

2) Home Entertainment and Control

Smart power, advanced temperature control system, safety and security, movies and music 3) Home Recognition System Water temperature sensor, power sensor, energy monitoring, fire and theft monitoring, smart devices and access sensors 4) Mobile Service Mobile payment, mobile monitoring and control, mobile security and access control, mobile healthcare and remote support 5) Commercial Buildings Energy monitoring, air conditioning, lighting, access control 6) Industrial Factories Process control, material management, environment management, energy management, industrial device control, M2M communication \<Zigbee Device Type>

Figure 4:
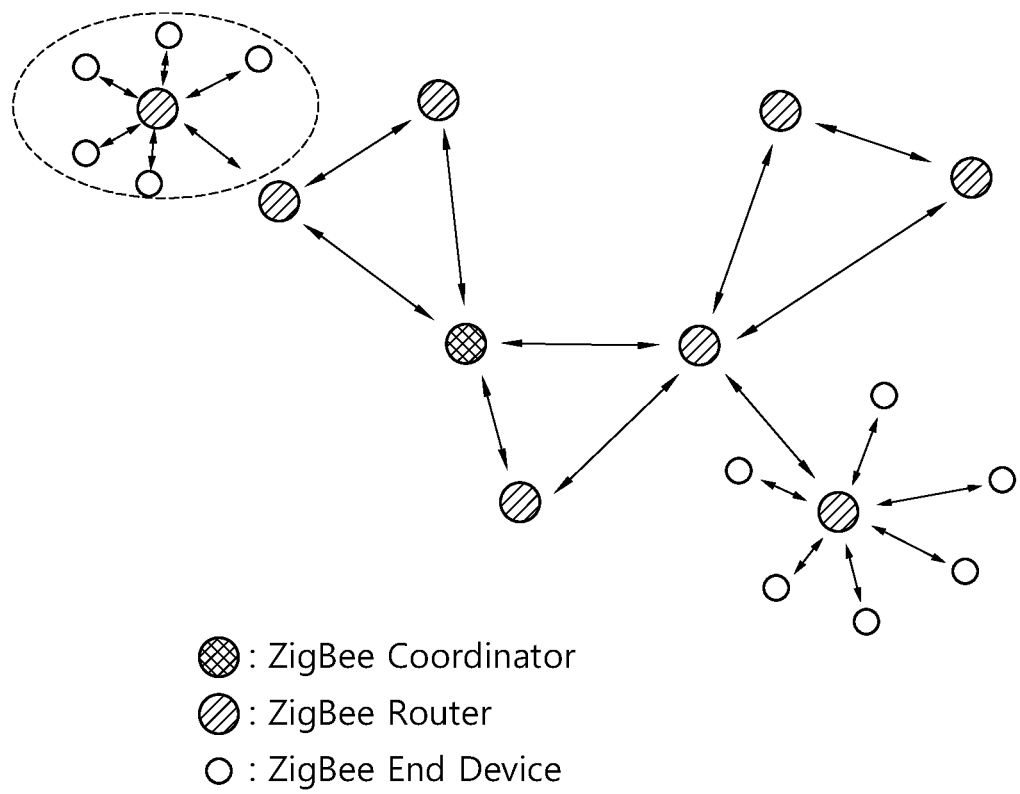
FIG. 4 shows Zigbee device types.

FIG. 4 shows Zigbee device types.

There are three types of Zigbee devices as shown in FIG. 4.

1) Zigbee Coordinator

It forms a network with the most important devices and connects them to other networks. Each network has only one coordinator. The ZigBee coordinator can store information about the network and also serves as a trust center or storage for security keys.

2) Zigbee Router

A router can function not only as an application function, but also as a writer that can forward data from other devices.

3) Zigbee End Device

ZigBee end devices include the ability to communicate with parent nodes. This relationship allows the node to wait a long time, extending battery life even further.

\<Zigbee Stack>

Figure 5:
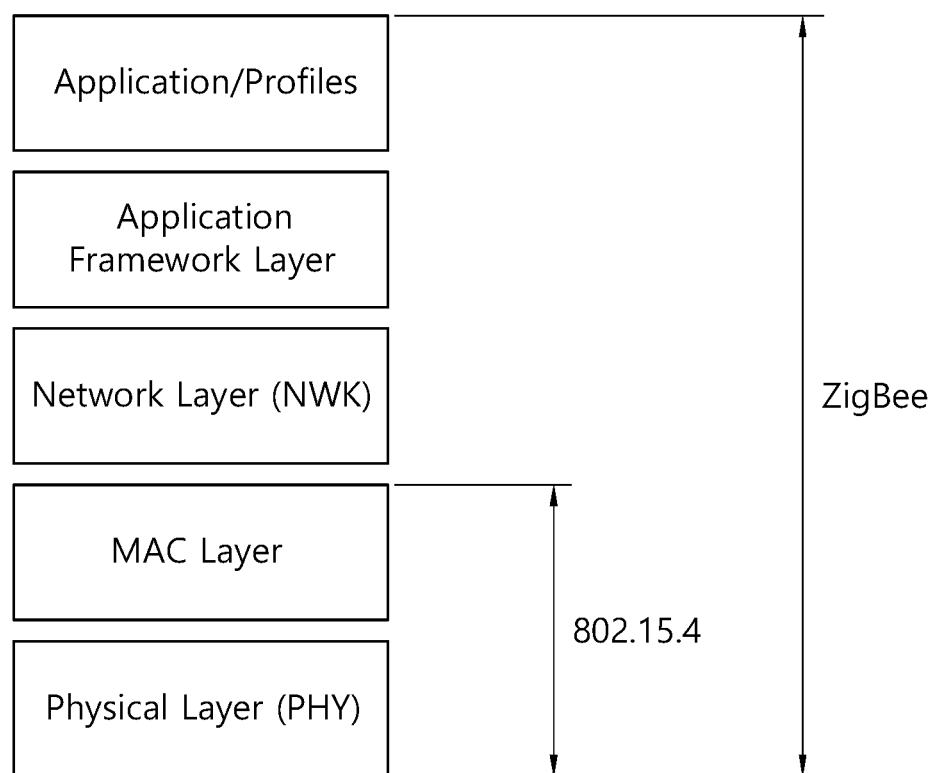
FIG. 5 shows a Zigbee stack.

FIG. 5 shows a Zigbee stack.

Zigbee is simpler than many other protocol stacks, and the Zigbee stack code size is small compared to other protocols. MAC and PHY are defined by the IEEE 802.15.4 standard. Network and application layers are defined by the Zigbee Alliance and the actual application provided by equipment designers.

802.15.4 is a simple packet data protocol for lightweight wireless networks. 802.15.4 was created to monitor and control applications where battery life is critical. 802.15.4 is at the root of ZigBee's excellent battery life.

802.15.4 can apply both IEEE long/short addressing. Short addressing is used for network management where network IDs are provisionally determined. This makes it less costly, but still enables use of around 65,000 network nodes.

In addition, 802.15.4 enables reliable data transmission and beacon management.

The network layer ensures proper operation of the MAC layer and provides an interface to the application layer. The network layer supports star, tree, and mesh topologies. The network layer is where networks are started, joined, destroyed, and retrieved.

The network layer is responsible for routing and security.

The application framework is an execution environment in which application objects can send and receive data. The application object is determined by the manufacturer of the Zigbee device. As defined by Zigbee, the application object is located at the top of the application layer and is determined by the device manufacturer. The application object actually builds the application; This could be a light bulb, light switch, LED, I/O line, etc.

Looking at home appliances released these days, the modifier 'smart' is almost mandatory. It is difficult to find products that are not 'smart', such as smart TVs, smart refrigerators, smart air conditioners, and smart washing machines. These smart products implement various convenience functions based on IoT (Internet Of Things) technology, which is equipped with wired and wireless networks, communicates closely with each other, and interlocks with each other. If you combine various sensors with IoT technology, such as temperature and humidity sensors, door sensors, motion sensors, and IP cameras, you can use more precise and diverse automation functions.

When a number of these smart products are gathered and applied to one house, a 'smart home' is born. If you live in such a home, you can use a variety of automated or remote functions, such as automatically turning on lights or air conditioners when you are ready to go home from outside work, and automatically playing appropriate music depending on the day's weather. Other similar concepts include 'smart building' and 'smart factory'.

However, there are side effects caused by the proliferation of smart products and the proliferation of products of various standards. It's just a compatibility issue. The core of IoT technology is communication and linkage between devices, and if each device uses a different IoT platform and does not link with each other, its usability is greatly reduced.

For example, if the speaker is a product based on the 'Apple HomePod' platform, but the TV is only compatible with the 'Samsung SmartThings' platform, you may not be able to use the function of turning on the TV or switching channels through voice commands. Of course, recently, one product supports two or more IoT platforms at the same time. Or, there is a way to decorate a smart environment by purchasing all products only based on the same platform. But even so, it is inconvenient to have to carefully check compatibility every time you buy a product.

But in the future you won't have to worry about that. This is because major IoT-related companies have gathered and announced standard specifications that enable all devices to be compatible without platform dependency. In May, the CSA (Connectivity Standards Alliance) standards association introduced an IoT standard protocol called 'Matter'. Formerly known as Project CHIP (Connected Home over IP), the Matter standard is being supported by Amazon, Google, Signify (Philips Hue), SmartThings, and other major players in the smart home market.

There are dozens of companies that have participated in or announced cooperation in establishing Matter standards, including Samsung Electronics, Google, Amazon, Apple, Tuya, Huawei, and Schneider Electric, all of which are global companies with a high share in the IoT market. If the Matter standard spreads widely, all smart devices will now work seamlessly without having to worry about manufacturers or platforms.

Matter is an IP-based protocol that can run over existing network technologies such as Wi-Fi, Ethernet, and Thread. The federation said Matter devices can be easily set up using Bluetooth Low Energy (BLE). It is explained that users do not have to do complicated configuration work because smart home devices can inform each other of their identity and possible operations.

In particular, Matter's 'multi-admin' feature allows products from various ecosystems, such as Apple HomeKit and Amazon Alexa, to work together without complicated work by end users. Multi-Manager also sets up layers of control to help different family members connect to smart appliances in the home with different levels of control.

2. Embodiments Applicable to this Specification

This specification proposes a method for configuring multiple controllers in a smart home environment where an IoT controller controls and monitors IoT devices. In particular, when a device that can be additionally controlled by the initially connected controller is added, and a new IoT device is added in an environment with several added controllers, a method in which all controllers can easily set the control authority for the additional device is proposed. In the case of non-account-based communication between adjacent devices, such as Connected Home over IP (CHIP), overall operations such as adding and deleting device control authority and adding devices are explained. In the past, IoT devices were controlled or monitored in a smart home environment on an account-based (using the same account) or cloud-based basis. In the present specification, a method for configuring multiple controllers in a smart home environment by proposing a connection protocol between independent device entities is proposed.

This specification is a technology to solve the disadvantage that several controllers cannot control CHIP devices when one existing CHIP controller configures a CHIP network. Standards such as the existing CHIP define only server-client operations with controller as client and accessories as server, so communication between controllers is not described.

In this specification, scenarios and requirements are defined to support one or multiple CHIP controllers, and in detail, i) how to add a new controller to an existing CHIP network, ii) add a new accessory in an environment with multiple CHIP controllers iii) How to delete the authority of a specific controller or exclude a controller from the network in an environment with multiple controllers, iv) Description and operation method for an accessory to connect to multiple controllers at the same time at the request of the controller, v) Operation and method of merging independent CHIP networks by a user or a controller are described.

According to the operating method described in this specification, the CHIP controller and the controllable devices can dynamically configure the network and support/operate multiple controllers.

Although this specification is described based on CHIP, it is not limited to CHIP and can be extended and applied to a general device-to-device communication environment.

2.1 Usage Scenarios 2.1.1 Adding a CHIP Controller to an Existing CHIP Network

Figure 6:
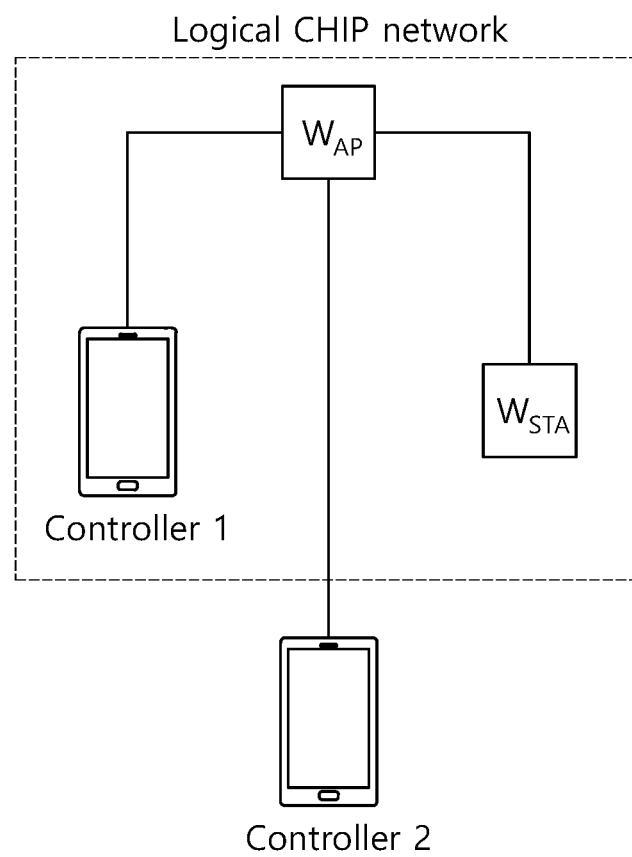
FIG. 6 shows an example of adding a new CHIP controller to an existing CHIP network.

FIG. 6 shows an example of adding a new CHIP controller to an existing CHIP network.

The following is a description of a scenario in which multiple controllers of multiple users are networked using CHIP technology.

Alice has a CHIP network consisting of a smartphone (controller 1) and an accessory ($W_{STA}$). They are already connected to the Home Access Point ($W_{AP}$).

Bob is a family member of Alice and has a smartphone (controller 2) that is also a CHIP authentication device. And the two controllers can connect with different ecosystems or vendors.

Bob wants to join the existing Alice's CHIP network and control the accessory.

Alice opens the CHIP application on her smartphone and presses the "Add User" button in the UI. Alice can then view "Bob's Controller" in the User Interface (UI) and add permissions to control her accessories.

Alternatively, when Bob opens the CHIP application on her smartphone and presses the "discovery" button in the UI, he can see "Alice's Controller" in his UI and he asks her for permission to join her CHIP network.

After setting his permissions, Bob can see the added accessory in his device list.

Alice and Bob can then control her accessory simultaneously.

<Requirements>

A CHIP controller must be able to discover other CHIP controllers by the CHIP standard protocol. A CHIP controller already connected to an existing CHIP network must be able to discover the CHIP device to become a controller. A CHIP controller not connected to a CHIP logical network must be able to discover an existing CHIP network and CHIP manager.

CHIP controllers must support a provisioning mechanism between controllers. The CHIP controller must be able to establish a secure session to transmit authorization information (access control). Controllers can be connected to other ecosystems. Provisioning refers to the service setting process that provides users with accounts, account access rights, account-related rights, and all resources necessary for account management. In particular, from the user's point of view, as a type of service, telecommunications providers automatically set up a user's line through a program to connect a user's line to an appropriate network, and a user sets up a desired service from a web-based interface or other client interface.

A CHIP controller (administrator) can delete other CHIP controllers from an existing CHIP network.

2.1.2 Adding Accessories to an Existing CHIP Network

The following is a description of a scenario in which multiple controllers of multiple users are networked using CHIP technology.

Alice and Bob connected the same logical CHIP network consisting of two or more CHIP controllers and accessories. All are connected to the same home access point. Controllers can connect with other ecosystems or vendors.

Bob wants to buy a new CHIP certified light bulb and install it on his family's CHIP network.

Bob uses his smartphone to perform the onboarding process in a CHIP standard way.

After the onboarding process, he set up the configuration for Alice to use the light bulb.

The light bulb can be controlled simultaneously with Bob's smartphone and Alice's smartphone.

<Requirements>

A CHIP controller can initiate secure channel establishment with other CHIP controllers within an existing logical CHIP network based on the CHIP standard approach.

A CHIP controller can communicate with other CHIP controllers about entitlement information when a CHIP accessory is added or deleted. These CHIP controllers can be associated with other ecosystems.

Based on the authorization information, the CHIP controller can synchronize access control lists and device lists.

The above procedure can only be started by an admin controller.

2.1.3 Accessories Connected to Multiple CHIP Networks

The following is a description of a scenario in which one accessory operates in addition to multiple CHIP networks.

Alice has her own logical CHIP network (CHIP Network-1) and Bob has a separate logical CHIP network (CHIP Network-2) in the same location.

Alice brought a new CHIP-enabled IoT sensor device (accessory) to share with Bob, and after she purchased the product, she went through an onboarding process to connect the accessory to the CHIP network. Then, she set up a configuration in the application so that the accessory could connect to different CHIP networks simultaneously.

Bob can discover the accessory as a new device based on the CHIP standard. He can do the onboarding process without a factory reset on the accessory.

An accessory can connect to both Alice's network and Bob's network simultaneously. And Alice and Bob can read the sensing data simultaneously.

<Requirements>

Accessories can support multiple connections with different CHIP networks. And controllers can connect with other ecosystems or vendors.

The CHIP controller is configurable whether an accessory allows multiple connections.

2.1.4 Merging of CHIP Networks

The following is a scenario for merging between networks in an environment with multiple CHIP networks.

Alice has her own logical CHIP network (CHIP Network-1) of her own and Bob has a separate logical CHIP network (CHIP Network-2) in the same location.

Alice and Bob agree to merge their networks into one network in order to share devices with each other.

Alice opens the CHIP authentication app and presses the "Discovery" button to search for Bob's controller.

She selects Bob's network and sends a network merge request. Bob then accepts the request.

Alice can then see her original accessory and a list of all accessories connected to Bob's network. Bob can also see his accessory and a list of all accessories on Alice's network.

<Requirements>

A CHIP controller must be able to discover other CHIP controllers (or CHIP networks) by means of the CHIP standard protocol.

CHIP controllers must support inter-controller provisioning mechanisms. The CHIP controller must be able to establish a secure session to transmit messages for network merge negotiation.

After network merging is complete, all CHIP controllers and all accessories are connected to the same logical chip network and can communicate with each other regardless of previous CHIP network configurations.

2.2 Operation Sequence

2.2.1 Adding a CHIP Controller to an Existing CHIP Network

As shown in FIG. 6, the smartphone (Controller 1) and the accessory ($W_{STA}$) device are pre-connected to the Access Point ($W_{AP}$). At this time, Controller 1 (smartphone App) scans the Quick Response (QR) Code of $W_{STA}$ according to the CHIP standard or checks the existence of the device by searching through Bluetooth Low Energy (BLE), connects the device to the AP in the premises, and verifies whether the device is legitimate or not based on the certificate. Controller 1 and $W_{STA}$ form a logical CHIP network. This means that the device authentication and registration process defined in CHIP has been completed while being connected to the AP based on IP and enabling communication.

In order to control the existing device by adding a new controller, Controller 2, to the corresponding Logical CHIP Network, the existing Controller 1 searches for the existence of Controller 2, completes the IP layer connection, and completes certificate-based device-to-device authentication before performing control. You must complete the Access Control settings for A new CHIP device is added to the existing CHIP Logical Network, and a method for Controller 1 and Controller 2 to control the accessory ($W_{STA}$) is proposed.

Figure 7:
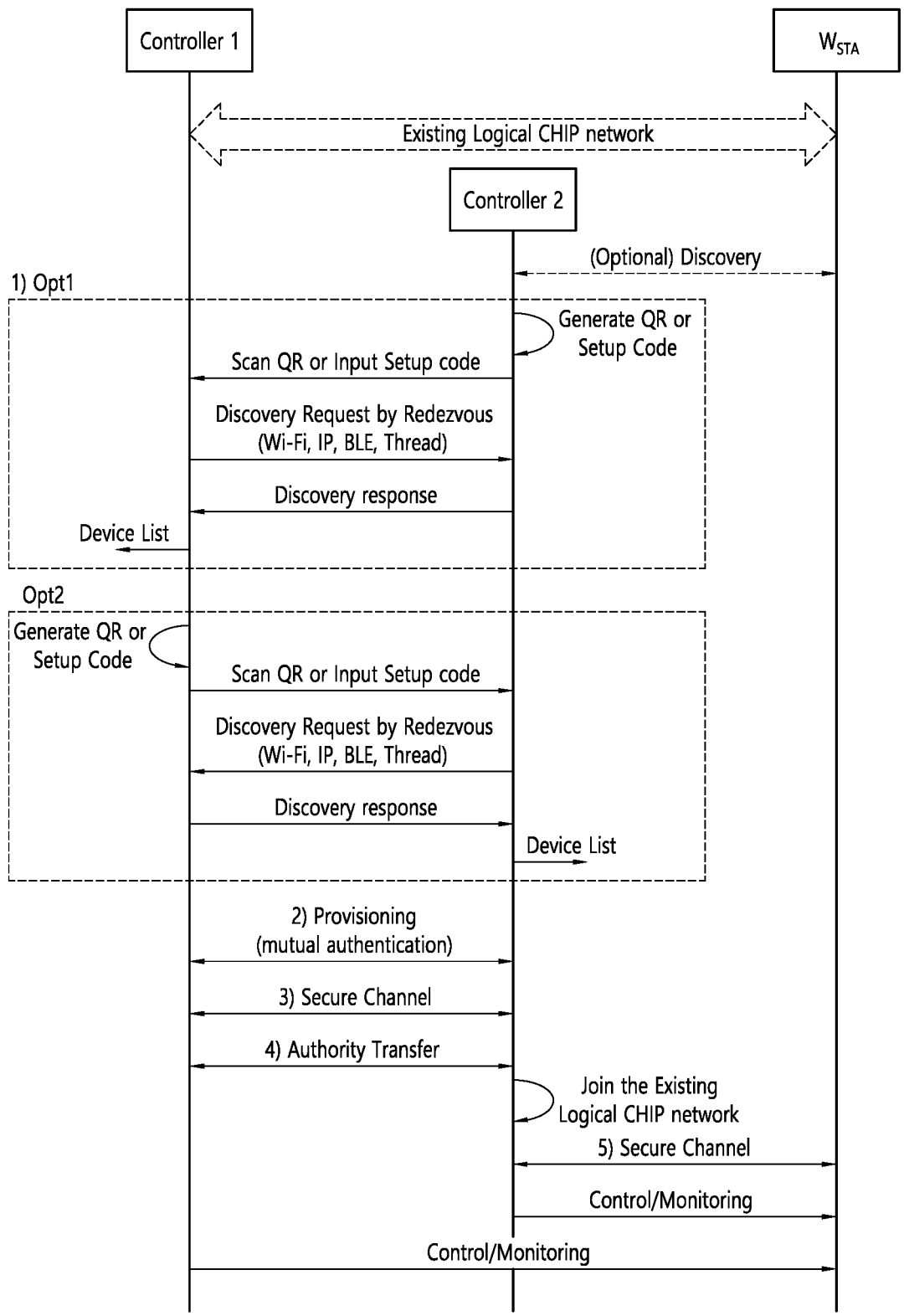
FIG. 7 is a sequence diagram for supporting multiple controllers based on CHIP.

FIG. 7 is a sequence diagram for supporting multiple controllers based on CHIP.

Controller 1 and $W_{STA}$ are CHIP networks configured according to the original CHIP standard. Controller 2 is a controller to be newly added to the network.

1) Search

Option 1—Controller 1 Discovers Controller 2

Controller 1 and Controller 2, which have ownership of the initial CHIP network, run the App to add the network. In the case of Controller 2, the App generates a QR Code/Setup Code (PIN code). Controller 1 scans the QR through the camera or manually inputs the Setup up code displayed on the screen of Controller 2.

At this time, the QR/Setup code includes a value for configuring a secure session between controllers.

Methods other than QR Code/Setup Code may be considered, or this process may be omitted.

Controller 1 searches for Controller 2 using Wi-Fi/BLE/IP/Thread. For this search method, the search method between the controller and accessories in the CHIP standard can be reused, or the search between controllers can be newly defined. Controller 2's device information, App information, status, and user information are delivered to Controller 1 as a search result, and Controller 1 can display the search result on the screen.

Option 2—Controller 2 Discovers Controller 1
　Alternatively, Controller 2 can search for Controller 1 and request network addition. Controller 1 and Controller 2 run the App, and Controller 1 shows a QR or setup code on the screen. Controller 2, which wants to connect to the network, scans the QR or manually inputs the setup code in the App. After that, as in Option 1, Controller 1 can be searched by the discovery method defined in the CHIP standard, and the search result can be displayed on the screen of Controller 2.

2) Certification

Controller 1 or Controller 2 found in the search step requires mutual CHIP authentication. This certification is the process of checking whether the counterpart device is a CHIP certified device and whether the manufacturer of the App is a member of the Zigbee Alliance. This process is based on mutual authentication, and may be one-way authentication in which Controller 1 authenticates only Controller 2, if necessary. Authentication is based on an X.509 type certificate, and the certificate includes the signature of the Root CA of the Zigbee Alliance and authentication through the corresponding Root Public Key. It can be followed, or the authentication method can be extended or newly defined in both directions. A secure channel can be created based on the Root Public Key.

3) Secure Channel Connection

Controller 1 and Controller 2 set up a secure channel to transmit management messages for mutual network joining. This secure channel means a secure session in the transport layer, such as TLS, and is established using each public key included in the certificate and the setup code exchanged in the search step. After the connection to the initial Secure Session is completed, Controller 1 and Controller 2 internally store information such as information about the other party (certificate, public key, ID, IP/Port endpoint), and can be used later when reconnection to the Secure Session is required.

4) Authority Exchange

Controller 1 has control authority for the accessory ($W_{STA}$) upon initial connection. According to the CHIP standard, during initial onboarding, an Operational Credential, which is access control information of the accessory, is issued and delivered to the accessory. In this authority exchange step, Controller 1 transfers authority to Controller 2. This is a Management Message type newly defined in CHIP and can be operated in Request/Response 2-way or Request/Response/Confirm 3-way. The authority information of the accessory delivered by Controller 1 includes information such as the accessory's name, manufacturer, HW version, SW version, unique ID, IP address, MAC address, certificate related to authentication, and public key. The credential is cryptographic personal information used in a specific application of an information system, and may include a password, which is cryptographic information used to verify identity, public key/private key pair used in public key cryptography algorithm, public key certificate issued by public certification authority, trusted root certification authority (e.g., KISA top-level certification authority) related information, authorization information, etc.

Option 1—Controller 1 Designates an Authorizing Device and Forwards it to Controller 2
　Controller 1 can deliver authority for one or several devices among its own accessories. The selection of the device to transfer the authority can be selected through the user UI, and when multiple devices are selected, it can be transmitted to Controller 2 in the form of a list/data structure.

Option 2—Controller 2 Requests Permission for a Specific Device to Controller 1
　If Controller 2 knows the existence of the accessory in advance, it can request authority for a specific device to Controller 1. The way Controller 2 can know the existence and status of an accessory in advance is that even if the device is already connected to the CHIP network, when Controller 2 scans the device's QR/Setup Code or When searching for a device by methods such as Wi-Fi, BLE, Thread, or IP. If the accessory is already connected to a specific CHIP network, the device will return a status such as "connected" as a search result during the search process, and in the case of Controller 2, the accessory is not be able to be registered through the initial onboarding process defined in the CHIP standard.
　Depending on the case, Controller 2 can deliver information such as the ID, IP, Owner name of Controller 1 that has current ownership and authority of the Accessory from the search result received from the Accessory, and can search by designating Controller 1 in the search step (Option 2) of step 1) based on the information.

5) Search for Accessories and Connect to a Secure Session

Controller 2, which acquired the authority of the accessory in the previous step, searches for and connects the accessory to control the accessory. The information for connection uses the accessory information obtained in the authority transfer step of step 4). Controller 2 attempts a secure session connection to the accessory, and the secure session is then used to transmit Management/Control messages with the accessory.

2.2.2 Adding Accessories to an Existing CHIP Network

Figure 8:
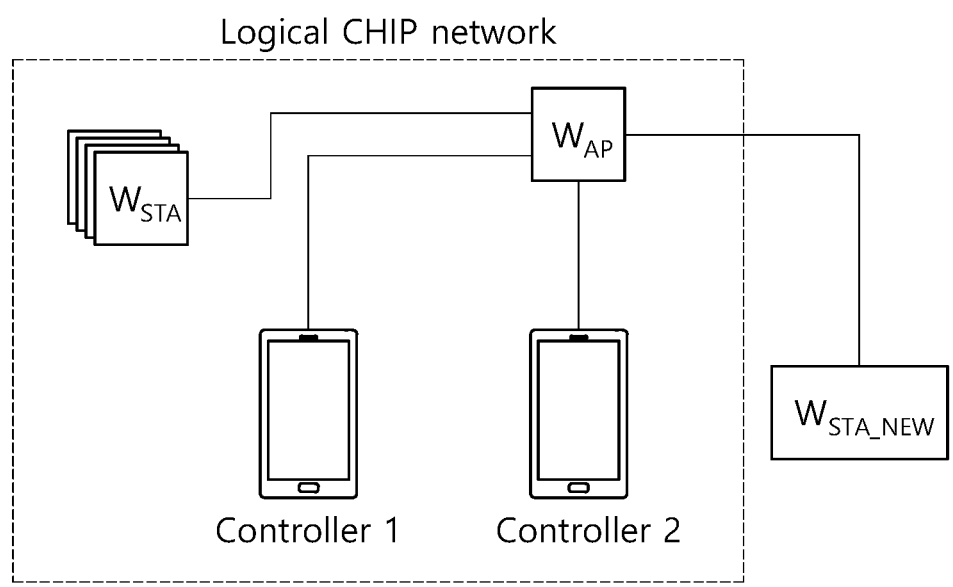
FIG. 8 shows an example of adding a new Accessory in a Multi-Controller environment.

FIG. 8 shows an example of adding a new Accessory in a Multi-Controller environment.

FIG. 8 is a description of a method in which a multi-controller is used by adding a new accessory in a state where the multi-controller is configured according to the embodiment of 2.2.1. Controller 1 and Controller 2 configure the existing CHIP Logical Network and register and use a number of accessories. At this time, this embodiment proposes a method for initial onboarding of a new $W_{STA}$ so that Controller 1 and Controller 2 can use it together.

Figure 9:
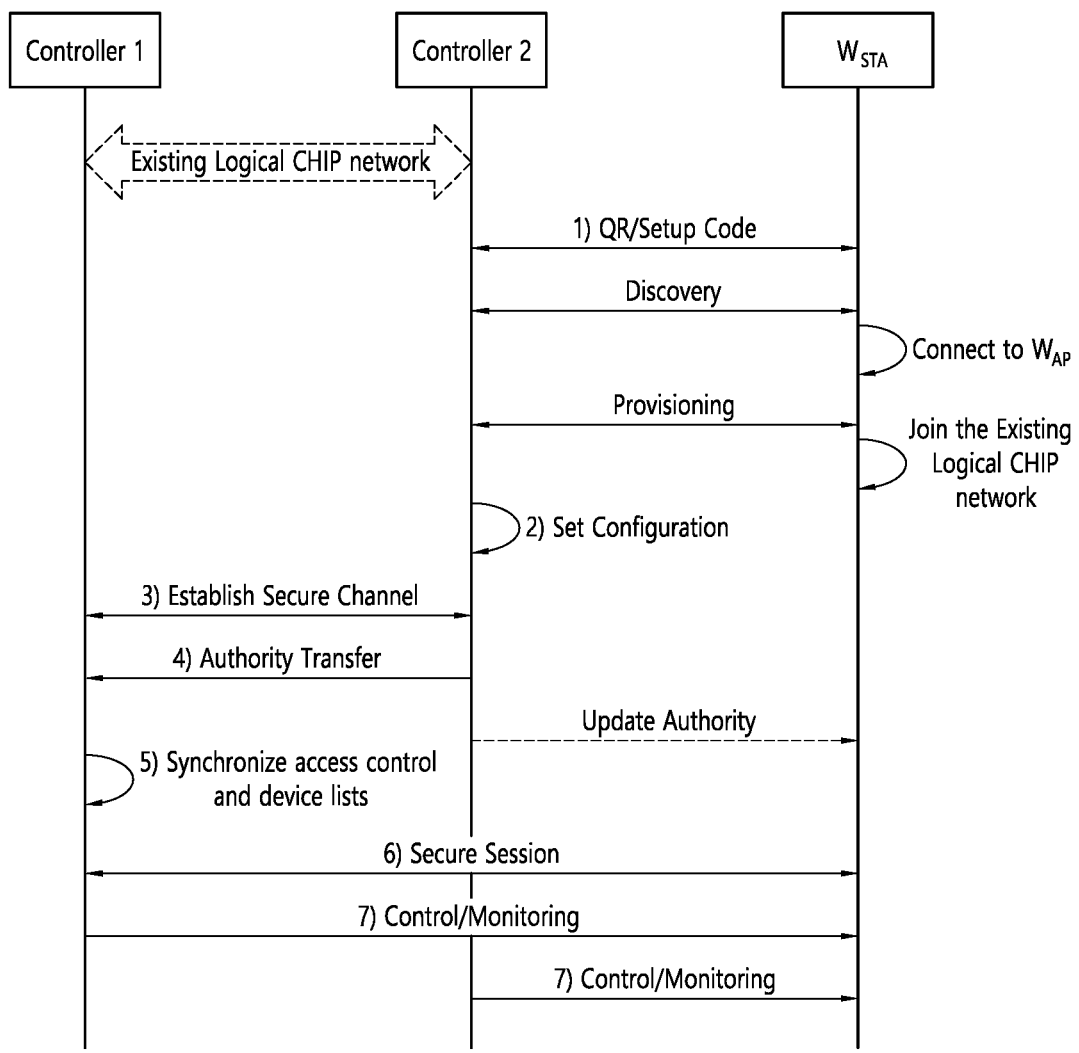
FIG. 9 shows an example of adding a new accessory to an existing CHIP network configured of multi-controllers.

FIG. 9 shows an example of adding a new accessory to an existing CHIP network configured of multi-controllers.

FIG. 9 shows a sequence of a method in which a controller adds a new accessory and sets the right to control a corresponding device to another controller in the same network. Controller 1 and Controller 2 are included in the same CHIP Logical Network according to method 2.2.1. $W_{STA\_NEW}$ is a CHIP accessory, a device that has not yet been networked and has not yet been configured.

1) The initial connection is the same as the existing technology of CHIP. First, Controller 2 scans the QR Code attached/displayed on the accessory to set the accessory or enters the Setup Code into the CHIP App. After QR, search is performed to connect to the network according to the CHIP standard (Rendezvous). At this time, Wi-Fi, BLE, Thread, and IP searches are possible. After searching, the accessory is connected to the $W_{AP}$, and authentication between devices (Attestation/Provisioning) is performed. This is also the same as the initial connection according to the CHIP standard, and Controller 2 stores the information corresponding to the authority of the accessory in its own device and delivers/stores the credential for operation to the accessory.

2) In this way, after the controller newly registers a new device, it can be set so that the right to use the registered device can be granted to other controllers in the current network. As an example, the user selects Controller 2 as a newly registered device through the UI, selects another controller currently in the CHIP logical network, and presses Share.

3) Controller 1 and Controller 2 establish a secure session between the controllers after confirming the existence of the current network (Presence Check/Locality Check). This secure session can reuse the session created through mutual authentication/one-way authentication when connecting to the initial network, or create a new secure session after a new authentication/confirmation process.

4) After the secure session is created, Controller 2 can transfer the authority for accessories to Controller 1. The Management Message required for authority transfer can be delivered in 2-way in the form of Request/Response or 3-way in the form of Request/Response/Confirm. As in 2.2.1, information required for authority may be information such as the name of the accessory, manufacturer, HW version, SW version, unique ID, IP address, MAC address, certificate related to authentication, public key, etc.

5) Through this permission setting process message, Controller 1 and Controller 2 can have the same device list and can synchronize the list of controllable devices visible to both devices.

When a controller with authority is added in this way, Controller 2 can update the information of Controller 1 that has authority added to the accessory. By adding information about Controller 1 to the previously issued Operation Credential in the form of X.509 and updating it, it is possible to proceed with the process of establishing a secure session between Controller 1 and accessories.

6) After completing this authority setting process, Controller 1 can establish a secure session based on the accessory and its authority information.

7) After setting the Secure Session, Controller 1 can control or monitor the accessory through the Session.

Although the embodiment of FIG. 9 has been described as an example in which a new accessory is added, device information and authority between multiple controllers can be adjusted and synchronized through the same process even when a device is deleted from an existing network or a device state is changed.

2.2.3 Removal of the Controller from the Existing CHIP Network

Deletion of controller device, Controller 1 describes the process of deleting the controller added to the initially configured network. When Controller 1 and Controller 2 belong to the same CHIP logical network, Controller 1 or Controller 2 can delete different controllers from the logical network.

Figure 10:
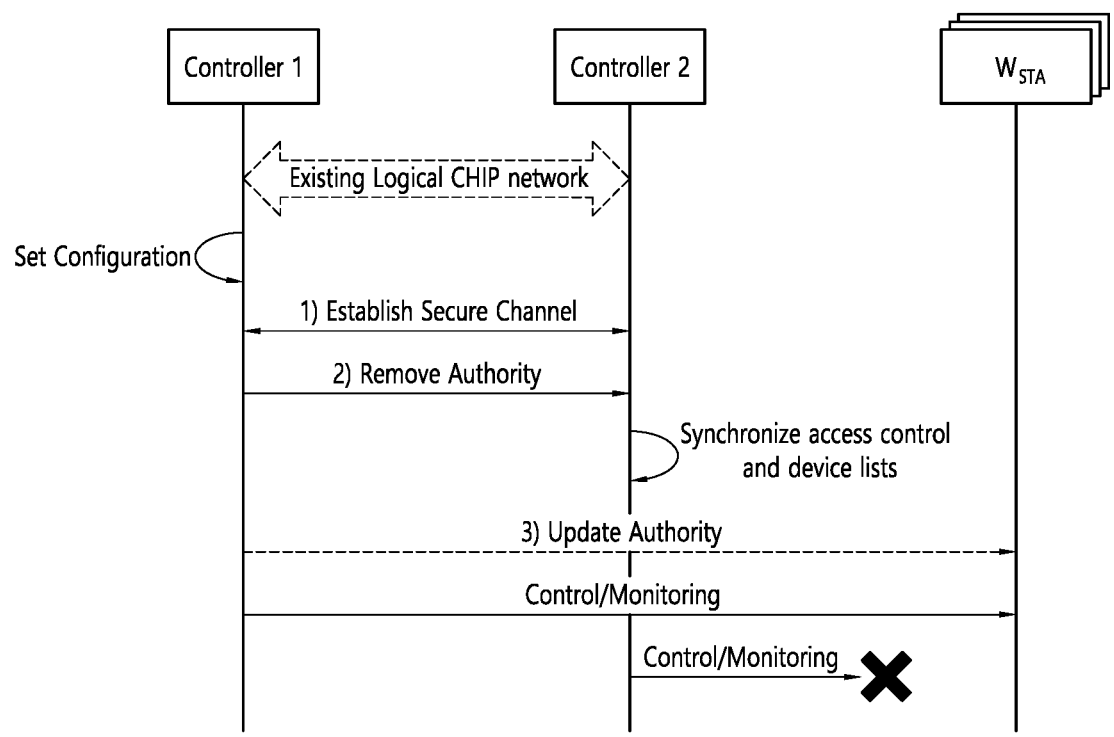
FIG. 10 shows an example of an operation according to accessory deletion in a multi-CHIP controller environment.

FIG. 10 shows an example of an operation according to accessory deletion in a multi-CHIP controller environment.

FIG. 10 illustrates an embodiment in which Controller1 deletes the authority of Controller 2.

1) Controllers 1 and 2 create a secure session between the two devices. At this time, a secure session can be connected by reusing existing information, and can be newly created after a new authentication.

2) Controller 1 delivers the Management Message for permission deletion to Controller 2. At this time, the message can proceed in 3-way in the form of Request/Response/Confirm or 2-way in the form of Request/Response.

3) After this Remove Authority process, controller 2 adjusts the authority for single or multiple accessories, and deletes the device from controller 2's UI or marks it as unauthorized.

As needed, Controller 1 will be able to update the accessory(s) about the changed privileges. At this time, the updated information deletes the information about Controller 2 in the Operational Credential, so that a secure session between Controller 2 and accessories cannot be connected in the future, or Management Message can be processed as Non-Authorized Message.

2.2.4 Accessories Connected to Multiple CHIP Networks

Figure 11:
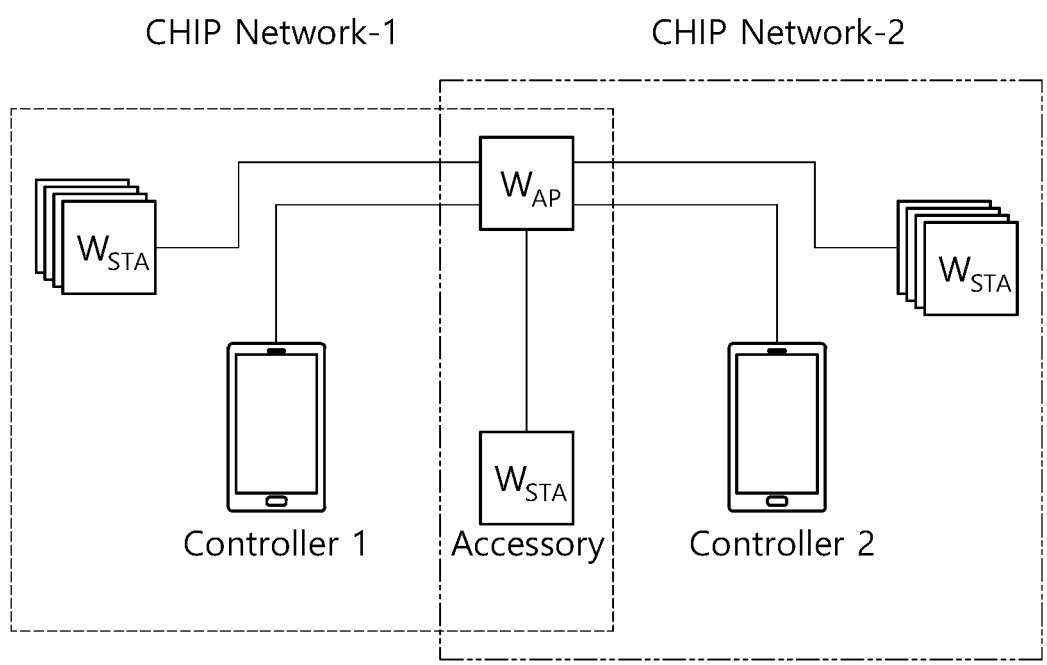
FIG. 11 shows an example of a case where one Accessory belongs to different multi-CHIP networks.

FIG. 11 shows an example of a case where one Accessory belongs to different multi-CHIP networks.

FIG. 11 is a case in which one CHIP accessory belongs to several logical CHIP networks. Controller 1 and accessories that make up Network 1 are connected to one access point, and Controller 2 and accessories that make up Network 2 are connected. Also, the $W_{STA}$ Accessory is physically connected to the same access point. Logically, it is divided into CHIP network 1 and CHIP network 2, and the $W_{STA}$ Accessory is logically connected to both networks at the same time.

Figure 12:
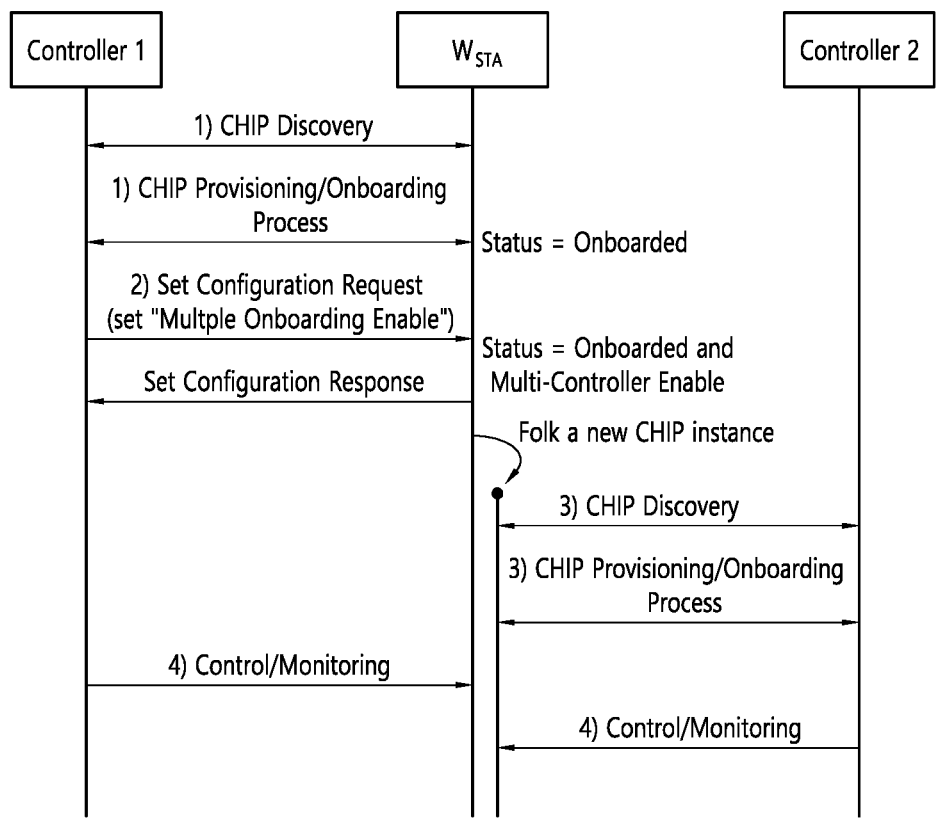
FIG. 12 shows an example of a method in which a CHIP Accessory through multiple instance support is connected to multiple CHIP Networks.

FIG. 12 shows an example of a method in which a CHIP Accessory through multiple instance support is connected to multiple CHIP Networks.

FIG. 12 shows an embodiment of a process in which one accessory connects to two logical CHIP networks.

1) $W_{STA}$ Accessory is initially connected by Controller 1. At this time, the initial connection method is connected according to the existing CHIP standard. Controller 1 initiates device registration through the QR or Setup Code of the $W_{STA}$ Accessory and proceeds with device search. Controller 1 then connects the accessory to the $W_{AP}$, sets up a secure session through the device authentication process, and completes the onboarding of the device by delivering Operational Credential. After that, the device is connected to the CHIP network to which Controller 1 belongs, and the status is Onboarded.

2) After that, Controller 1 can configure the device to be additionally registered in other networks. (Set Configuration Process) Controller 1 sends a Set Configuration Request message to the newly registered $W_{STA}$ Accessory device, and requests multiple onboarding enable in the message. The accessory responds with Set Configuration Response in response to the request. The accessory then changes its state to "Onboarded and Multi-Controller Enable". This status means that it has already been onboarded, but it can be additionally onboarded to a new network, and when a device is searched, it is searched by a controller other than Controller 1 and can be newly onboarded. After the corresponding response, the accessory internally creates a new CHIP instance (new logical CHIP Network) and forks the instance so that it can handle requests from other devices. There is no correlation between the existing CHIP instance and the newly forked instance, and the device's sensor and actuator information is internally synchronized between instances. A fork is an operation in which a process duplicates itself and overlays itself on another program in order to start the execution of another program. It can be seen that a device such as $W_{STA}$ (CHIP Controlee) operates as a single process as a Controlee, then creates a process that functions as a new Controlee. That is, it can be seen that the Controlee creates two objects (instances) such as multi-process and multi-thread, Process1 communicates/controls with Controller-1, and Process 2 communicates/controls with Controller-2 at the same time.

At this time, during the search and connection process, the Accessory informs that it has the capability to support multiple logical CHIP networks. Based on this information, Controller 1 knows whether the setting of the corresponding device is possible.

3) Controller 2 then performs the new device registration process according to the CHIP standard. Start device registration initiation through the QR code or Setup Code of the $W_{STA}$ Accessory, and proceed with device search. Controller 2 then connects the accessory to the $W_{AP}$, goes through the device authentication process, establishes a secure session, and delivers the Operational Credential to complete device onboarding.

4) Newly connected devices can be controlled/monitored by Controller 1 and Controller 2, respectively.

2.2.5 Merging of CHIP Networks

Figure 13:
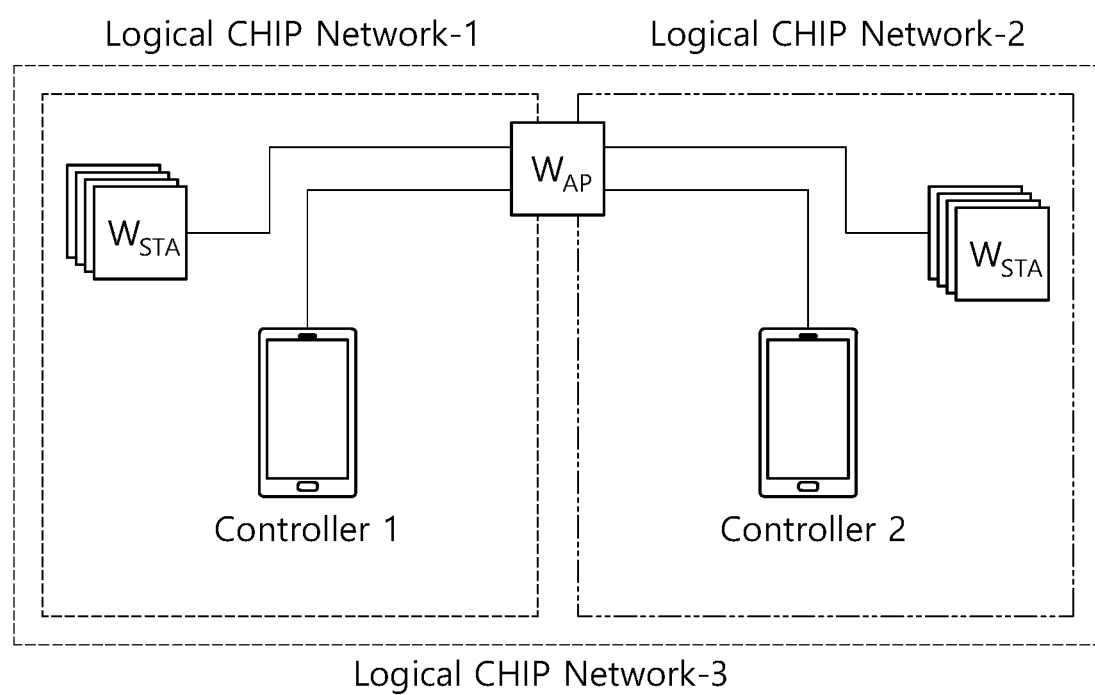
FIG. 13 shows an example in which CHIP networks are merged.

FIG. 13 shows an example in which CHIP networks are merged.

FIG. 13 shows a process of merging two independent CHIP networks into one CHIP network by a user's request or command. 13 is a form in which several CHIP controllers and accessories are physically connected to one access point, and logically, CHIP network 1 and CHIP network 2 are operated independently. Through the agreement/negotiation process between Controller 1 and Controller 2, the corresponding CHIP Network 1 and CHIP Network 2 are merged into one network (CHIP Network 3).

Figure 14:
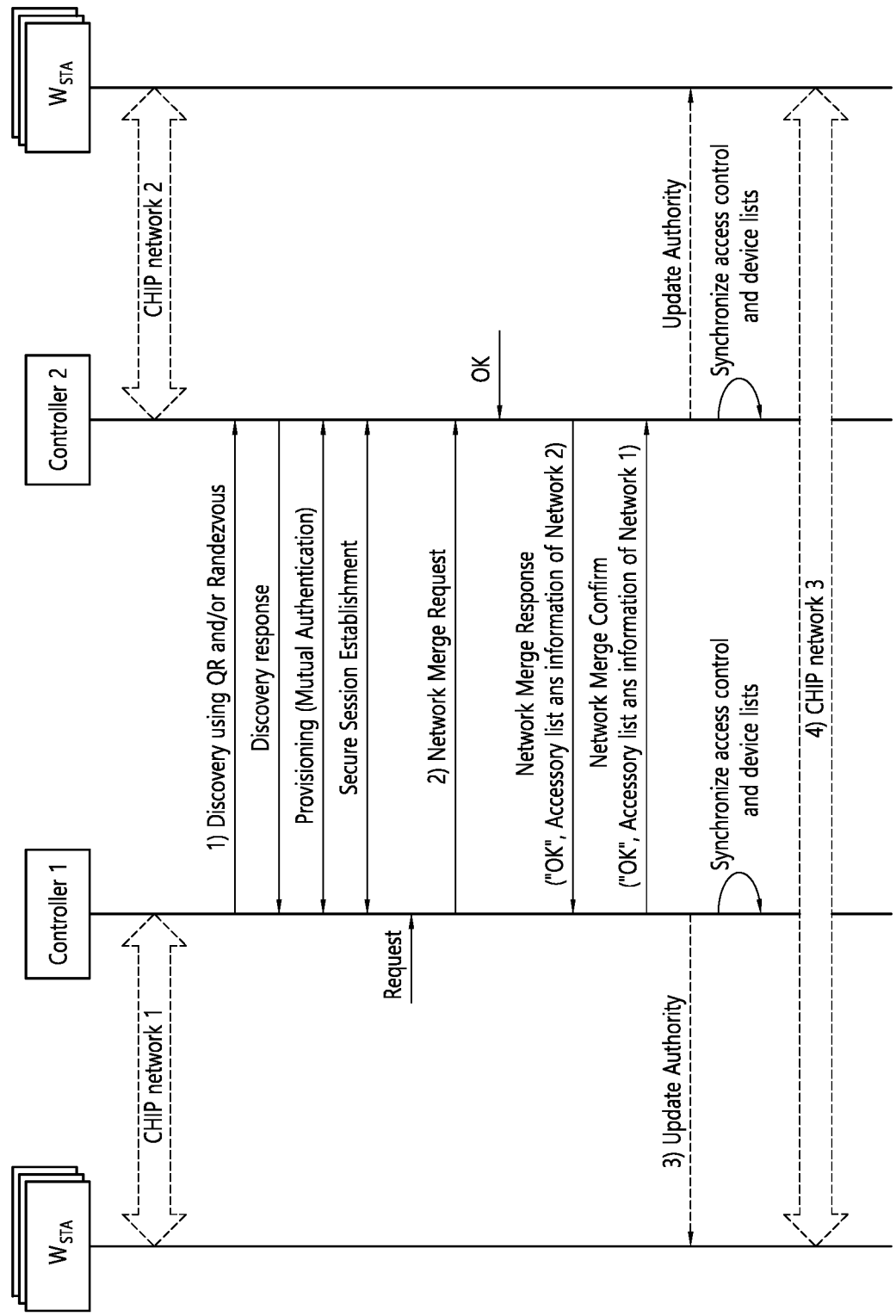
FIG. 14 shows a process of merging two CHIP Logical Networks into one.

FIG. 14 shows a process of merging two CHIP Logical Networks into one.

1) CHIP Network 1 to which Controller 1 belongs initially and CHIP Network to which Controller 2 belongs are devices connected to the same access point in the same space. Similar to the operation of 2.2.1, Controller 1 and Controller 2 can discover each other by including the QR/SETUP Code. At this time, the search method can use IP communication through Wi-Fi, BLE, and thread connectivity. When searching between the controllers of the two networks, the result of the search can obtain the information of the other controller and the network. After the search, similar to 2.2.1, controller 1 and controller 2 can establish a secure session, and to establish such a secure session, mutual authentication is required. Authentication is a process of checking whether it is a CHIP certified controller device based on the controller's certificate and whether it is legitimate.

2) According to the user's request, Controller 1 sends "Merge Request", a request message for merging networks to Controller 2. Upon receiving this, Controller 2 also waits for the user's confirmation input, and when the user confirms, it responds with Network Merge Response. This response message can contain not only the user's response, OK, but also information about accessories belonging to Network 2. If there are many accessories, the information can be configured in the form of a list, and the information is the information of each accessory belonging to Network 2, such as the name of the accessory, manufacturer, HW version, SW version, unique ID, IP address, MAC address, and authentication-related information. It may be information such as a certificate or public key. Upon receiving the Network Merge Response, Controller 1 returns to Controller 2 with a Network Merge Confirm message containing the information of each accessory belonging to Network 1. The information of the accessory belonging to Network 1 belonging to this Confirm message may also be information such as the accessory's name, manufacturer, HW version, SW version, unique ID, IP address, MAC address, certificate related to authentication, public key, etc.

3) When the message exchange process ends in this way, Controller 1 and Controller 2 each update the device list to be displayed on the App based on the other party's accessory information they received. If Controller 1 and Controller 2 transmit all the devices they own, the devices that Controller 1 and Controller 2 can control/monitor after Network Merge are in the form of a Union of the two networks, and the same type and number of devices are synchronized.

4) Through this process, Network 1 and Network 2 are merged to operate as Network 3, and all CHIP devices can be expanded and operated as one CHIP Network.

In the previous embodiment, the network by $W_{AP}$ is physically one, but logically several CHIP networks may be provided for one $W_{AP}$. In addition, it is assumed that Controllers 1 and 2 in the previous embodiment are independent entities, not account-based or cloud-based connected entities.

Hereinafter, the above-described embodiment will be described with reference to FIGS. 1 to 14.

Figure 15:
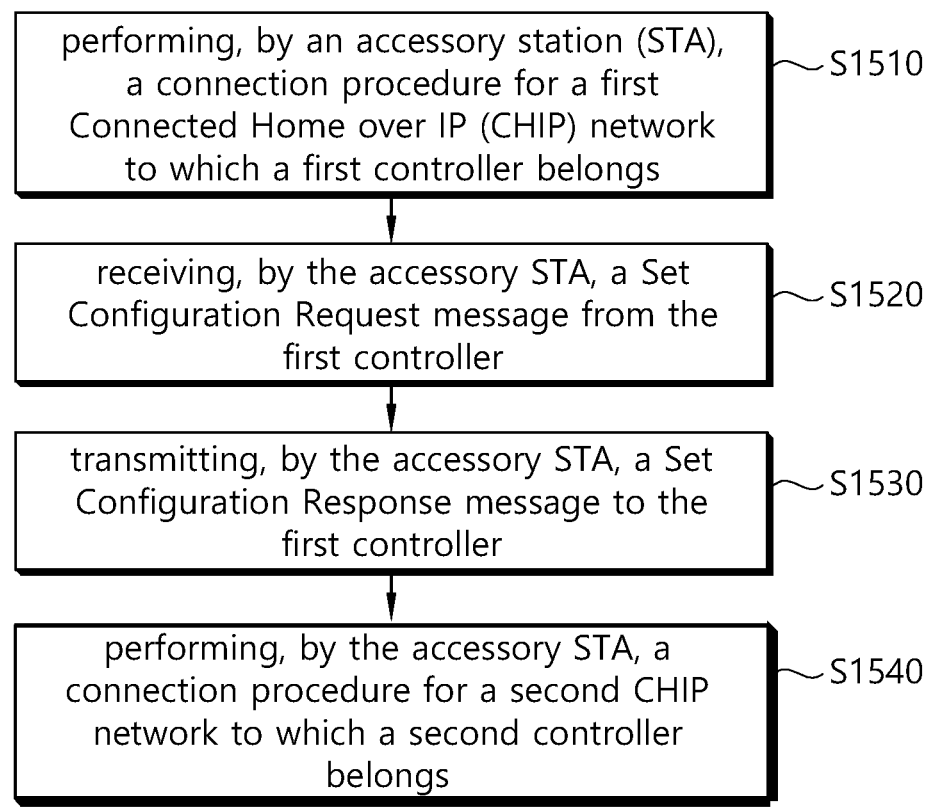
FIG. 15 is a flowchart illustrating a procedure in which one accessory STA is connected to a plurality of different CHIP networks according to the present embodiment.

FIG. 15 is a flowchart illustrating a procedure in which one accessory STA is connected to a plurality of different CHIP networks according to the present embodiment.

This embodiment proposes a method for controlling or monitoring an IoT device by a plurality of IoT controllers belonging to different CHIP networks in a smart home environment where the IoT controller controls or monitors the IoT device. First and second controllers described below may correspond to the IoT controller device, and an accessory STA may correspond to the IoT device. It is assumed that the first and second controllers are not entities connected to each other on based on an account or a cloud, but are operated independently of each other.

In step S1510, an accessory station (STA) performs a connection procedure for a first Connected Home over IP (CHIP) network to which a first controller belongs. In the connection procedure for the first CHIP network, the accessory STA may be registered or searched based on a Quick Response (QR) code or a setup code of the accessory STA. The accessory STA may be connected to an access point (AP) by the first controller. After the accessory STA is authenticated by the first controller, a first secure channel may be established between the accessory STA and the first controller. The first secure channel may be generated based on each public key included in the certificate and the setup code. After receiving a first operational credential from the first controller through the first secure channel, the accessory STA may be set to an onboarded state for the first CHIP network. The first operating credential is access control information or authority information of the accessory STA, which can include the accessory STA's name, manufacturer, hardware version, software version, unique ID, IP address, MAC address, certificate related to authentication, public key, etc.

In step S1520, the accessory STA receives a Set Configuration Request message from the first controller. The Set configuration Request message includes information that the accessory STA can be additionally connected to another CHIP network. That is, the Set Configuration Request message may request a configuration change so that the accessory STA can be on-boarded to a plurality of CHIP networks.

In step S1530, the accessory STA transmits a Set Configuration Response message to the first controller. The Set Configuration Response message is a response to the Set Configuration Request message, and after the Set Configuration Response message is transmitted, the accessory STA is onboarded for the first CHIP network, and the accessory STA may be further changed to a state capable of onboarding to other CHIP networks.

After the Set Configuration Response message is transmitted, the accessory STA may generate an instance for the other CHIP network. The accessory STA may inform the first controller of a capability of the accessory STA. The capability of the accessory STA may be a capability that the accessory STA supports a plurality of CHIP networks.

In step S1540, the accessory STA performs a connection procedure for a second CHIP network to which a second controller belongs. The connection procedure for the second CHIP network may be performed based on instances for the other CHIP network. In the connection procedure for the second CHIP network, the accessory STA may be registered or searched based on the QR code or the setup code of the accessory STA. The accessory STA may be connected to the AP by the second controller. After the accessory STA is authenticated by the second controller, a second secure channel may be established between the accessory STA and the second controller. The second secure channel may be generated based on each public key included in the certificate and the setup code. After receiving a second operational credential from the second controller through the second secure channel, the accessory STA may be set to an onboarded state for the second CHIP network. The second operating credential is access control information or authority information of the accessory STA, and can include the accessory STA's name, manufacturer, hardware version, software version, unique ID, IP address, MAC address, certificate related to authentication, public key, etc.

Through the above procedure, the accessory STA may be connected to the second CHIP network as well as the first CHIP network. The AP may be physically connected to the first and second controllers and the accessory STA. That is, the first controller configuring the first CHIP network and the accessory STA may be connected to one AP, and the second controller configuring the second CHIP network may be connected to the accessory STA. The network by the AP may be physically configured of one network, but the CHIP network may be logically configured of several networks for one AP (the first and second CHIP networks may be logically distinguished). That is, the AP may be physically connected to the first and second controllers and the accessory STA. The accessory STA may be simultaneously logically connected to the first and second CHIP networks.

As such, the accessory STA is controlled or monitored by the first and second controllers. Specifically, the accessory STA may receive a first control message from the first controller through the first secure channel and receive a second control message from the second controller through the second secure channel. In this case, the accessory STA may be controlled or monitored by the first controller based on the first control message, and controlled or monitored by the second controller based on the second control message.

In addition to the above-described embodiments, it may operate as an embodiment of adding a new controller (second controller) to an existing CHIP network (first CHIP network), an embodiment of adding a new accessory STA (second accessory STA) to an existing CHIP network (first CHIP network), an embodiment of deleting or excluding a controller (first controller) from an existing CHIP network (first CHIP network), or an embodiment of generating one CHIP network (third CHIP network) by merging a plurality of CHIP networks (first and second CHIP networks). Each embodiment may operate with reference to the above-described information.

3. Device Configuration

Figure 16:
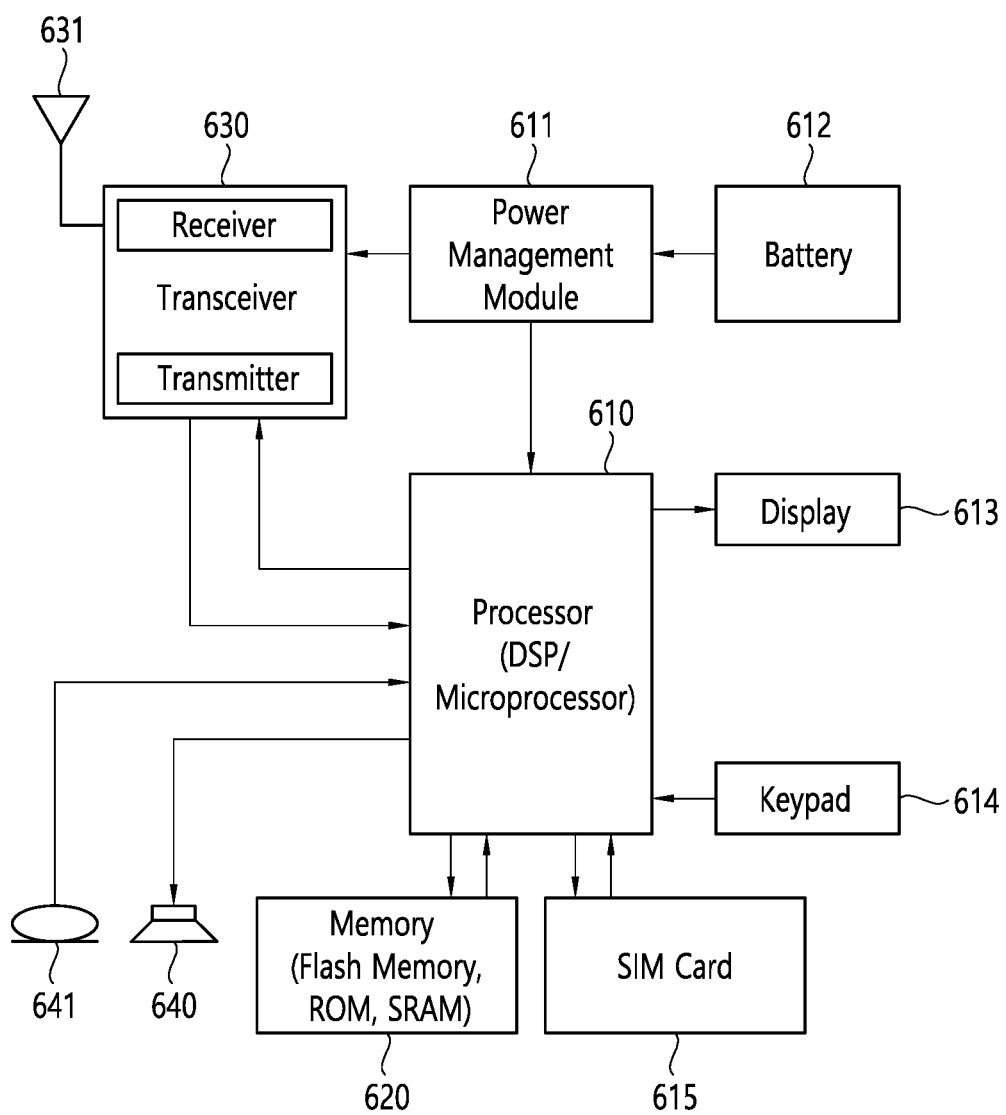
FIG. 16 shows a modified example of the transmitting device and/or the receiving device of the present specification.

FIG. 16 shows a modified example of the transmitting device and/or the receiving device of the present specification.

Each device/STA of the sub-figure (a)/(b) of FIG. 1 may be modified as shown in FIG. 16. A transceiver 630 of FIG. 16 may be identical to the transceivers 113 and 123 of FIG. 1. The transceiver 630 of FIG. 16 may include a receiver and a transmitter.

A processor 610 of FIG. 16 may be identical to the processors 111 and 121 of FIG. 1. Alternatively, the processor 610 of FIG. 16 may be identical to the processing chips 114 and 124 of FIG. 1.

A memory 620 of FIG. 16 may be identical to the memories 112 and 122 of FIG. 1. Alternatively, the memory 620 of FIG. 16 may be a separate external memory different from the memories 112 and 122 of FIG. 1.

Referring to FIG. 16, a power management module 611 manages power for the processor 610 and/or the transceiver 630. A battery 612 supplies power to the power management module 611. A display 613 outputs a result processed by the processor 610. A keypad 614 receives inputs to be used by the processor 610. The keypad 614 may be displayed on the display 613. A SIM card 615 may be an integrated circuit which is used to securely store an international mobile subscriber identity (IMSI) and its related key, which are used to identify and authenticate subscribers on mobile telephony devices such as mobile phones and computers.

Referring to FIG. 16, a speaker 640 may output a result related to a sound processed by the processor 610. A microphone 641 may receive an input related to a sound to be used by the processor 610.

The technical features of the present disclosure may be applied to various devices and methods. For example, the technical features of the present disclosure may be performed/supported through the device(s) of FIG. 1 and/or FIG. 16. For example, the technical features of the present disclosure may be applied to only part of FIG. 1 and/or FIG. 16. For example, the technical features of the present disclosure may be implemented based on the processing chip(s) 114 and 124 of FIG. 1, or implemented based on the processor(s) 111 and 121 and the memory(s) 112 and 122, or implemented based on the processor 610 and the memory 620 of FIG. 16. For example, the device of the present specification is a device operating in a wireless LAN system in a smart home environment, and the device includes a memory and a processor operably coupled to the memory, wherein the processor is configured to perform a connection procedure for a first Connected Home over IP (CHIP) network to which a first controller belongs; receive a Set Configuration Request message from the first controller; transmit a Set Configuration Response message to the first controller; and perform a connection procedure for a second CHIP network to which a second controller belongs.

The technical features of the present disclosure may be implemented based on a computer readable medium (CRM). For example, a CRM according to the present disclosure is at least one computer readable medium including instructions designed to be executed by at least one processor.

The CRM may store instructions that perform operations including performing a connection procedure for a first Connected Home over IP (CHIP) network to which a first controller belongs; receiving a Set Configuration Request message from the first controller; transmitting a Set Configuration Response message to the first controller; and performing a connection procedure for a second CHIP network to which a second controller belongs. At least one processor may execute the instructions stored in the CRM according to the present disclosure. At least one processor related to the CRM of the present disclosure may be the processor 111, 121 of FIG. 1, the processing chip 114, 124 of FIG. 1, or the processor 610 of FIG. 16. Meanwhile, the CRM of the present disclosure may be the memory 112, 122 of FIG. 1, the memory 620 of FIG. 16, or a separate external memory/storage medium/disk.

The foregoing technical features of the present specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claims of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method in a wireless local area network (WLAN) system of a smart home environment, the method comprising:

performing, by an accessory station (STA), a connection procedure for a first Connected Home over IP (CHIP) network to which a first controller belongs;

receiving, by the accessory STA, a Set Configuration Request message from the first controller;

transmitting, by the accessory STA, a Set Configuration Response message to the first controller; and performing, by the accessory STA, a connection procedure for a second CHIP network to which a second controller belongs, wherein the Set Configuration Request message includes information that the accessory STA can additionally connect to another CHIP network, and wherein the accessory STA is controlled or monitored by the first and second controllers.

2. The method of claim 1, wherein in the connection procedure for the first CHIP network, the accessory STA is registered or searched based on a Quick Response (QR) code or a setup code of the accessory STA, the accessory STA is connected to an access point (AP) by the first controller, after the accessory STA is authenticated by the first controller, a first secure channel is established between the accessory STA and the first controller, after receiving a first operational credential from the first controller through the first secure channel, the accessory STA is set to an onboarded state for the first CHIP network.

3. The method of claim 2, wherein in the connection procedure for the second CHIP network, the accessory STA is registered or searched based on the QR code or the setup code of the accessory STA, the accessory STA is connected to the AP by the second controller, after the accessory STA is authenticated by the second controller, a second secure channel is established between the accessory STA and the second controller, the second secure channel is generated based on each public key included in the certificate and the setup code, after receiving a second operational credential from the second controller through the second secure channel, the accessory STA is set to an onboarded state for the second CHIP network.

4. The method of claim 3, further comprising:

receiving, by the accessory STA, a first control message from the first controller through the first secure channel; and receiving, by the accessory STA, a second control message from the second controller through the second secure channel, wherein the accessory STA is controlled or monitored by the first controller based on the first control message, and controlled or monitored by the second controller based on the second control message.

5. The method of claim 3, wherein the AP is physically connected to the first and second controllers and the accessory STA, wherein the accessory STA is simultaneously logically connected to the first and second CHIP networks.

6. The method of claim 1, further comprising:

wherein after the Set Configuration Response message is transmitted, generating, by the accessory STA, an instance for the other CHIP network; and informing, by the accessory STA, the first controller of a capability of the accessory STA, wherein the capability of the accessory STA is a capability that the accessory STA supports a plurality of CHIP networks.

7. An accessory STA in a wireless local area network (WLAN) system of a smart home environment, the accessory STA comprising:

a memory;

a transceiver; and a processor being operatively connected to the memory and the transceiver, wherein the processor is configured to:

perform a connection procedure for a first Connected Home over IP (CHIP) network to which a first controller belongs;

receive a Set Configuration Request message from the first controller;

transmit a Set Configuration Response message to the first controller; and perform a connection procedure for a second CHIP network to which a second controller belongs, wherein the Set Configuration Request message includes information that the accessory STA can additionally connect to another CHIP network, and wherein the accessory STA is controlled or monitored by the first and second controllers.

8. The accessory STA of claim 7, wherein in the connection procedure for the first CHIP network, the accessory STA is registered or searched based on a Quick Response (QR) code or a setup code of the accessory STA, the accessory STA is connected to an access point (AP) by the first controller, after the accessory STA is authenticated by the first controller, a first secure channel is established between the accessory STA and the first controller, after receiving a first operational credential from the first controller through the first secure channel, the accessory STA is set to an onboarded state for the first CHIP network.

9. The accessory STA of claim 8, wherein in the connection procedure for the second CHIP network, the accessory STA is registered or searched based on the QR code or the setup code of the accessory STA, the accessory STA is connected to the AP by the second controller, after the accessory STA is authenticated by the second controller, a second secure channel is established between the accessory STA and the second controller, the second secure channel is generated based on each public key included in the certificate and the setup code, after receiving a second operational credential from the second controller through the second secure channel, the accessory STA is set to an onboarded state for the second CHIP network.

10. The accessory STA of claim 9, wherein the processor is further configured to:

receive a first control message from the first controller through the first secure channel; and receive a second control message from the second controller through the second secure channel, wherein the accessory STA is controlled or monitored by the first controller based on the first control message, and controlled or monitored by the second controller based on the second control message.

11. The accessory STA of claim 9, wherein the AP is physically connected to the first and second controllers and the accessory STA, wherein the accessory STA is simultaneously logically connected to the first and second CHIP networks.

12. The accessory STA of claim 7, wherein after the Set Configuration Response message is transmitted, wherein the processor is further configured to:

generate an instance for the other CHIP network; and inform the first controller of a capability of the accessory STA, wherein the capability of the accessory STA is a capability that the accessory STA supports a plurality of CHIP networks.

* * * * *